April 2, 1968

R. F. SCOTT ETAL 3,375,885

BURROWING APPARATUS

Filed Sept. 13, 1965

INVENTORS.
RONALD F. SCOTT
EARLE A. HOWARD
GEORGE M. HOTZ

Christie, Parker & Hale
ATTORNEYS.

United States Patent Office 3,375,885
Patented Apr. 2, 1968

3,375,885
BURROWING APPARATUS
Ronald F. Scott, Altadena, Earle A. Howard, La Canada, and George M. Hotz, Altadena, Calif., assignors to California Institute Research Foundation, Pasadena, Calif., a corporation of California
Filed Sept. 13, 1965, Ser. No. 486,884
12 Claims. (Cl. 175—26)

ABSTRACT OF THE DISCLOSURE

A soil burrowing mole in which a housing has an auger blade wound around a front portion thereof which is rotatable about a housing longitudinal axis relative to an externally finned housing rear portion upon operation of driving means in the housing to cause the housing to advance through soil and the like. The housing carries a sensor sensitive to deviation of the housing axis from a predetermined path and to which is coupled means responsive to the sensor output for steering the housing to maintain the path.

---

Figure 1:
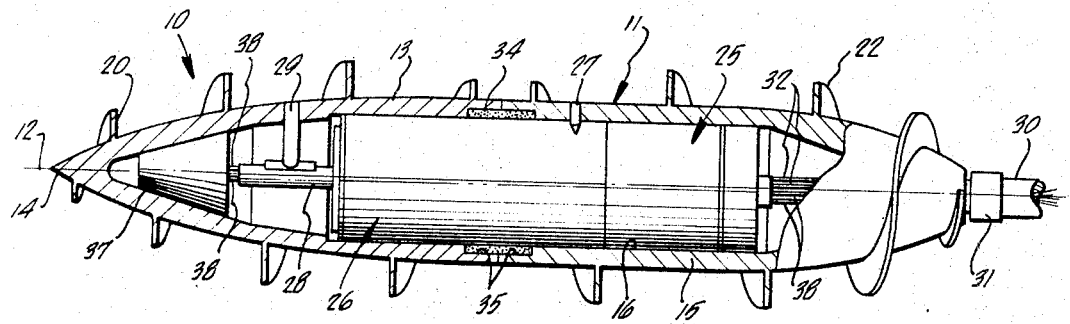

This invention relates to burrowing apparatus for use in soils and the like. More particularly, it relates to self-propelled soil penetrometers.

The invention described herein was made in the performance of work under NASA contract and is subject to the provisions of the National Aeronautics and Space Act of 1958, Public Law 85–568 (72 Stat. 426; 42 U.S.C. 2451), as amended.

Soil penetrometers, used for obtaining measurements of soil strength and density characteristics, for example, are of two basic types. One type of penetrometer includes a plunger which is forced into the ground surface. The force required to drive the plunger a predetermined distance into the ground, or the torque which must be applied to the plunger to cause the plunger to rotate in the soil, are measured; from such measurements the soil strength and density characteristic may be inferred. Penetrometers of this type may be used only close to the surface of the soil. The second type of penetrometer now used can be used at greater depths, but the use of such devices require that a hole for the penetrometer first be drilled in the soil. The desired measurements are then made in the manner described above by means of a plunger which is engaged either with the bottom of the hole or with the walls of the hole. Penetrometers of the second type have the disadvantage that they can be used only after a hole has first been drilled in the soil to the depth at which the measurements are to be made.

This invention provides apparatus which can be used as a soil penetrometer either at shallow soil depths as well as at depths which, if existing penetrometers were used, would require that a hole first be drilled in the soil. The penetrometer, however, makes its own hole and thus it does not require the prior existence of a hole. Moreover, the penetrometer is such that data from which soil strength and density characteristics, as well as any other soil characteristics desired, can be obtained continuously as the penetrometer moves deeper and deeper into the soil.

Summary of the invention

Generally speaking, this invention provides a burrowing apparatus for use in soils and the like. The apparatus includes a housing having a forward portion and a rear portion. The forward portion of the housing is coaxially aligned with and substantially abutted against the housing rear portion. Auger means are secured to the exterior of the housing forward portion and extend helically along and around the housing forward portion from the forward end thereof toward the housing rear portion. Guide fin means are secured to and extend along the exterior of the housing rear portion. Drive means are mounted in the housing and are operable for rotating the forward portion of the housing about its axis relative to the rear portion of the housing.

Figure 2:
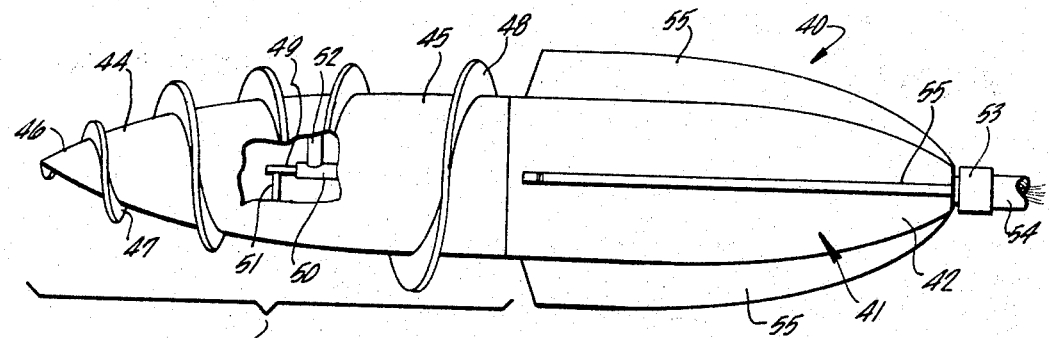
Figure 3:
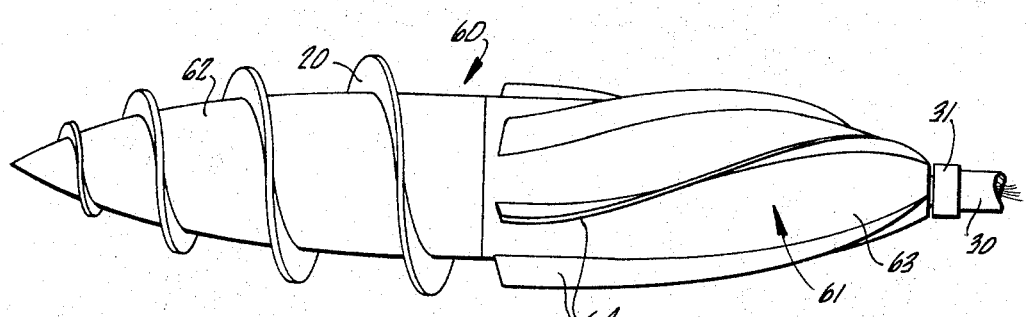
Figure 4:
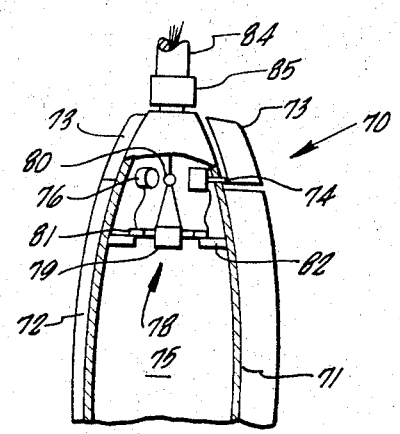

The above-mentioned and other features of the invention are more fully set forth in the following detailed description of presently preferred embodiments thereof, which description is presented in conjunction with the accompanying drawings wherein:

FIG. 1 is a side elevation view, partly in cross-section, of a burrowing apparatus according to this invention;
FIG. 2 is a side elevation view of another burrowing apparatus according to this invention;
FIG. 3 is a side elevation view of another burrowing apparatus according to this invention; and
FIG. 4 is a cross-sectional elevation view of a portion of another burrowing apparatus according to this invention.

FIG. 1 illustrates a burrowing apparatus or mole 10 according to this invention. The apparatus is especially adapted for use as a soil penetrometer. The mole includes a housing 11 having a longitudinal axis 12 about which the housing is substantially symmetrical. The housing has a forward portion or part 13 having a pointed forward end 14. The housing also includes a rear portion or part 15 which is coaxially aligned with the housing forward part and is substantially abutted at its forward end with the rear end of the housing front part. The forward and rear parts of the housing are hollow and, in combination, define an elongate chamber 16 within the housing.

An auger blade 20 is secured to the exterior of the housing front part as shown in FIG. 1. The auger blade spirals helically along and around the housing front part from the pointed forward end of the housing toward the rear housing part. In mole 10, the auger blade extends to the joint between the forward and rear housing parts; it will be understood, however, that the auger blade may be terminated intermediate the length of the housing forward part without departing from the scope of the present invention.

Guide fin means, in the form of an auger blade 22, are secured to the exterior of the rear part of the housing and extend along the housing. Auger blade 22 spirals along and around the rear housing part in a direction opposite to the spiral of auger blade 20. That is, as shown in FIG. 1, auger blade 20 spirals clockwise around the housing and auger blade 22 spirals counterclockwise around the housing. The helices of auger blades 20 and 22 have equal pitch in mole 10.

An electric motor 25 is mounted in chamber 16 within the rear housing part. The motor is mounted so that it is secured from rotation relative to the rear housing part. The motor has a rotatable shaft (not shown) which is connected to a transmission or gearbox 26 mounted within chamber 16 forwardly of the motor. The transmission is secured to the housing rear part by a pin 27 so that the transmission does not rotate relative to the housing rear part. The transmission contains a gear train defining a desired gear ratio between the motor shaft and a transmission output shaft 28. Shaft 28 extends forwardly of the transmission along axis 12 into the interior of the housing forward part where it is secured by a connecting arm 29 to the forward part of housing 11. Accordingly, upon operation of motor 25, housing forward part 13 is caused to rotate relative to housing rear part 15 in such a manner that the housing moves forwardly along axis 12 because of the operation of auger blade 20 upon soil or the like in which the mole is placed. Such operation of the motor causes a reaction to be imposed upon the housing rear part via pin 27 such that the housing rear part rotates in the opposite direction from the housing front part. Auger blade 22 thus is effective upon the surrounding soil to contribute to the forward movement of the mole.

A flexible multi-conductor electric cable 30 is connected to the mole at the rear end of the housing rear part. A conector 31, permitting relative rotary motion between the housing and the cable, is provided to couple the cable to the housing. Preferably connector 31 is of the slip ring-type and prevents rotation of the housing from being transferred to the cable. A plurality of conductors 32 extend from the connector to motor 25, as shown. The cable extends from the housing to a source of power and to recording instruments disposed remote from the mole.

To seal the interior of the housing from the exterior thereof, a sleeve 34 of deformable sealant material is disposed in cooperating inwardly opening recesses 35 formed in the housing parts at their abutting ends. Preferably sleeve 34 is fabricated of felt impregnated with tetrafluoroethylene to provide the additional function of being a self lubricating bearing.

The structure described above is suited for use in making soil strength measurements at locations not readily accessible. Such measurements are obtained indirectly by measuring the velocity of the mole through the soil and by measuring the amount of power required to drive the mole at the measured velocity. Useful information regarding soil strength characteristics can be derived from such data.

If desired, the mole can be retracted from the soil merely by reversing the direction of rotation of the forward portion of the housing relative to the rear portions. On the other hand, the mole may be left in the soil. In the latter case, if the cable is to be recovered, connector 31 is made so that the imposition of a predetermined amount of tension on cable 30 causes the cable to separate from the mole. The cable may then be reeled in any convenient manner. Alternatively, if desired, the connector can be constructed so that it maintains the connection between the cable and the mole when the cable is subjected to tension; such a device can be recovered by pulling on the cable, or it can be used as a self-imbedding anchor so long as the tension applied to the cable is less than the tension required to withdraw the mole from the soil into which it has burrowed.

During the process of placing or retrieving mole 10, it is preferred that a slight amount of tension be maintained on cable 30 to guide the mole. Where the mole is burrowing into the ground, the cable tension provides a function analogous to the function provided by the feathers on an arrow to keep the mole on its intended path.

The structure described above is useful as a soil penetrometer per se. Moreover, mole 10 has the additional or alternate feature of being a vehicle for the placement at remote locations of instruments designed to measure characteristics of the soil other than strength. An instrument transducer housing 37 is disposed in housing forward part 13 forwardly of transmission shaft 28. The transducer housing may contain one or more of the following instrument transducers: a magnetometer, a temperature sensor, a particle counter for measuring radioactivity, neutron and gamma radiation sources and counters for measuring soil moisture content and the wet density of soil, a seismometer, a gravimeter, a resistivity monitor for measuring the electrical resistance of soil, or a water pressure monitor for measuring the pore water pressure of soil. Conductors 38 from the instruments in housing 37 are connected to connector 31 via an axial bore through gear box shaft 28 and motor 25. Alternatively, the instrument housing may contain a power supply and a telemetry device where the mole is to be left in place after being located at its desired station.

Burrowing apparatus or mole 40, shown in FIG. 2, is similar to mole 10. Mole 40 has a housing 41 comprised of a rear portion 42 and a front portion 43 comprised of oppositely rotating sections 44 and 45. Front section 44 has a pointed forward end 46. An auger blade 7 is secured to the exterior of section 44 and spirals clockwise around the section from the forward end of the section to the rear end of the section. The exterior surfaces of section 45 are substantially continuous with the exterior of section 44 and with the exterior of housing rear portion 42. An auger blade 48, having the same pitch as auger blade 47, is secured to and spirals counterclockwise around and along the exterior of section 45. Mole 40 contains a drive motor (not shown) coupled to a transmission (not shown) having coaxial, oppositely rotating output shafts 49 and 50. The shafts rotate at equal speeds and are secured to housing sections 44 and 45, respectively, by connecting arms 51 and 52. When the motor of mole 40 is operated, housing sections 44 and 45 rotate in opposite directions so that the auger blades carried thereby drive the housing axially through soil in which the mole is disposed. Further, since the auger blades are contra-rotating, housing rear portion 42 is not caused to rotate. Accordingly, a simple connector 53 may be used to couple a power supply cable 54 to the housing.

Mole 40 also includes a plurality of fins 55 secured to the exterior of housing rear part 42 for guiding the mole through soil and the like. Since the housing rear portion is not rotated as the mole is operated, fins 55 extend linearly along the rear portion of the housing parallel to the housing axis.

FIG. 3 illustrates another burrowing device or mole 60 according to this invention. Mole 60 has a housing 61 comprised of a forward portion 62 and a rear portion 63. Housing forward portion 62 is substantially identical to housing forward portion 13 of mole 10 and thus is not described in detail. Housing rear part 63 differs from the rear part of the housing of mole 10 in that housing part 11 has guide fin means provided in the form of auger blade 22. In mole 60, however, the guide fin means secured to the housing rear portion are provided as a plurality of fin members 64 which are secured to and extend radially from the exterior of the housing rear portion. Fin members 64, in contrast to fins 55 of mole 40, spiral along and around the exterior of the housing rear portion in a direction opposite to the direction in which the auger blade carried by the housing front portion thus spirals around the housing axis. The pitch of the helix defined by each fin member, however, is considerably greater than the pitch of the auger blade. Accordingly, as the motor contained within mole 60 is operated, both the housing front and rear portions are rotated relative to the soil through which the mole moves. Thus, a connector 31 providing relative motion between flexible cable 30 and the housing is provided.

A device configured substantially identically to mole 60 has been built and operated successfully in soils. The housing has an overall length of approximately 7½ inches and a maximum diameter of approximately 1⅛ inches. The maximum diameter of the auger blade secured to the front part of the housing is 2¾ inches and has a pitch of ¾ inch. The motor has a stall torque of 20-ounce-inches. The output shaft of the transmission coupled to the motor rotates at 20 revolutions per minute. This device, when operated as a soil penetrometer in accord with the above description, produced measurements of soil strength which compared favorably with measurements obtained by more conventional devices. Such a device may be used to advantage, in combination with a telemetry system, on an unmanned lunar probe to obtain measurements of selected characteristics of the lunar surface. It will be understood, however, that the mole may be larger or smaller in size, if desired, without departing from the scope of the invention.

FIG. 4 illustrates another burrowing apparatus or mole 70 according to this invention. Mole 70 includes a rear housing part 71 carrying a plurality of guide fin members 72. Preferably three fins are provided, only two of which are shown in FIG. 4. Each fin member includes a steerable rudder 73 at its rear end. Each rudder is mounted to a rotatable shaft 74 which extends through the housing into an internal chamber 75 in the mole. A motor 76 is coupled to each shaft in chamber 75. Motors 76 are selectively operable to pivot rudders 73 about their mounting gudgeons in response to the operation of a mole guidance or attitude sensing device 78 so that the mole is steerable to maintain a predetermined path of movement through soil and the like in which it is disposed. The guidance device illustrated includes a conductive pendulum member 79 pivotally mounted at 80 to the housing rear part along the longitudinal axis of the mole. The lower end of the pendulum member is disposed within a control ring 81 mounted by nonconductive posts 82 to the housing rear part. The ring is disposed normal to and concentric to the axis of the mole. Ring 81 is comprised of a plurality of conductive sections which are insulated from each other. Preferably there are the same number of conductive sections in the ring as there are steerable rudders. Each conductive section of the ring is coupled to a respective one of motors 76. The attitude sensing mechanism described and illustrated is designed to maintain the mole in a vertical relation relative to the body through which it moves. Thus, as the mole is deflected from a vertical path, pendulum 79 contacts one of the conductive sections of ring 81. Pendulum 79 forms a portion of the conductive path which must exist before any one of motors 76 can be energized. Thus, as the pendulum contacts one of the conductive sections of ring 81, the rudder motor associated with that ring section is operated so that the corresponding rudder is deflected a predetermined amount. Continued movement of the mole through the soil causes the mole to return to its vertical path. Once the mole is restored to a vertical attitude, the pendulum swings clear of ring 81 and continued movement of the mole through the soil causes the previously deflected rudder to return to its undeflected position.

It will be understood that the guidance mechanism described above is only illustrative of various guidance mechanisms and systems which may be used in a mole according to this invention. For example, an inertial guidance system may be used if desired.

Mole 70 is illustrated as being of the tethered type wherein motive power is supplied to a drive motor (not shown) through a power supply cable 84 and a connector 85. It is apparent, however, that a mole equipped with guidance device and controllable rudders is suited for operation as an untethered burrowing device when the drive motor is powered from a power source contained within the mole; such a device is within the scope of the present invention.

A burrowing apparatus or mole according to the present invention may be used to provide soil measurements or to obtain soil samples from locations which are not otherwise accessible, such as from below buildings. Also, a mole according to this invention is readily suited for operation in an ocean floor; in such a case, the mole can be operated from a helicopter or from a ship. Further, the mole may be used as an anchoring mechanism in soils, particularly in soils under water. Moreover, an apparatus according to this invention may be used as a vehicle to transport materials through soil. For example, the mole may be used to set a seismic explosive charge at a suitable depth for carrying out geophysical prospecting. Also, several moles may be connected in tandem to increase the pull available, to pull a telephone cable through the ground.

The moles described above incorporate electric motors for rotating the housing parts relative to one another. It is also within the scope of this invention that compressed air motors may be used in conjunction with a compressed air hose in lieu of electrical cables 30, 54 or 84. Also, in large moles, an internal combustion engine may be used in conjunction with flexible air supply and exhaust ducts trailed behind the mole.

The invention has been described above by reference to several presently preferred embodiments of the invention merely for the sake of completeness and clarity of description. Modifications may be made to the described devices by substitutions of components between the different devices described. Moreover, additional modifications and alterations in the structures described may be made by workers skilled in the art without departing from the scope of the present invention. Accordingly, the foregoing description, presented by reference to particular embodiments of the invention should not be considered as limiting the scope of this invention.

What is claimed is:

1. Burrowing apparatus for use in soils and the like comprising an elongate housing having a forward portion and a rear portion coaxially aligned with each other, auger means secured to and extending helically along and around the exterior of the housing forward portion from the forward end thereof toward the housing rear portion, fin means secured to and extending along the exterior of the housing rear portion, drive means mounted in the housing for rotating the housing front portion about the housing axis relative to the housing rear portion, means in the housing operable to sense a deviation of the housing axis from a predetermined path and to provide an output in response thereto, and means coupled to the deviation sensing means operable in response to the output thereof for steering the housing to align the axis with the path.

2. Apparatus according to claim 1 wherein the means for steering the housing comprises a plurality of steerable rudder members.

3. Apparatus according to claim 2 wherein the fin means comprises a plurality of fin members extending radially outwardly of and along the housing rear portion, and each rudder member is disposed adjacent the rear end of a respective one of the fin members proximate the rear end of the housing.

4. Burrowing apparatus for use in soils and the like comprising an elongate housing having a forward portion and a rear portion coaxially aligned with each other, auger means secured to and extending helically along and around the exterior of the housing forward portion from the forward end thereof toward the housing rear portion, the housing forward portion including a forward section and a rear section rotatable relative to each other and relative to the housing rear portion, the auger means comprising a first auger blade secured to and extending in one direction along and around the exterior of the forward section and a section auger blade secured to and extending in the opposite direction along and around the exterior of the rear section, fin means secured to and extending along the exterior of the housing rear portion, and drive means mounted in the housing for rotating the housing front portion about the housing axis relative to the housing rear portion and including means for rotating the forward and rear sections of the housing forward portion in opposite directions about the housing axis.

5. Apparatus according to claim 4 wherein the means for rotating the forward and rear sections of the housing forward portion is constructed so that the sections rotate with substantially equal angular velocities, and the helices defined by the first and second auger blades have substantially equal pitches.

6. Apparatus according to claim 5 wherein the fin means comprises a plurality of fin members secured to and extending radially outwardly from the housing rear portion, the fin members extending substantially linearly along the housing rear portion.

7. Burrowing apparatus for use in soils and the like comprising an elongate housing having a forward portion and a rear portion coaxially aligned with each other, an auger blade secured to and extending helically along and around the exterior of the housing forward portion from the forward end thereof toward the housing rear portion, guide fin means secured to and extending along the exterior of the housing rear portion, electrical drive means mounted in the housing for rotating the housing front portion about the housing axis relative to the housing rear portion, electrical cable means coupled to the housing at the rear end of the housing rear portion for supplying electrical power to the drive means, connector means conductively coupling the cable means to the housing coaxially of the housing, the connector means being constructed so that the cable means is released from the housing when a tension exceeding a preselected tension is applied to the cable means.

8. Burrowing apparatus for use in soils and the like comprising an elongate housing substantially symmetrical about a longitudinal axis thereof, the housing having a forward part and a rear part coaxially aligned with and substantially abutted against each other, an auger blade secured to and extending helically in one direction along and around the exterior of the housing forward part from the forward end thereof toward the housing rear part, guide fin means secured to and extending substantially helically in the opposite direction along and around the exterior of the housing rear part, electrical drive means mounted in the housing for rotating the housing front part about the housing axis relative to the housing rear part, and means mounted to the housing for supplying electrical power to the drive means.

9. A self-propelled soil penetrometer comprising an elongate streamlined housing substantially symmetrical about a longitudinal axis thereof, the housing including a forward part having a pointed front end and a rear part coaxially aligned with and substantially abutted against the housing forward part, a first auger blade secured to and extending helically in one direction along and around the exterior of the housing forward part from the forward end thereof to the housing rear part, a second auger blade secured to and extending helically in the opposite direction along and around the exterior of the housing rear part, an electric motor mounted in the housing, a transmission coupled to the motor for operation by the motor and mounted to the housing so that the housing forward and rear parts rotate in opposite directions about the axis in response to operation of the motor, a flexible electrical conductor cable, and connector means mounted to the rear end of the housing coaxially thereof for conductively coupling the cable to the motor, the connector means being configured and arranged so that rotation of the housing rear part is isolated from the cable.

10. A self-propelled soil penetrometer comprising an elongate streamlined housing substantially symmetrical about a longitudinal axis thereof, the housing including a forward part having a pointed front end and a rear part coaxially aligned with and substantially abutted against the housing forward part, an auger blade secured to and extending helically in one direction along and around the exterior of the housing forward part from the forward end thereof to the housing rear part, a plurality of fin members secured to and extending along the exterior of the housing rear part, the fin members being spaced around the circumference of the housing rear part and spiralling in the opposite direction thereabout, an electrical motor mounted in the housing, a transmission coupled to the motor for operation by the motor and mounted to the housing so that the housing forward and rear parts rotate in opposite directions about the axis in response to operation of the motor, a flexible electrical conductor cable, and connector means mounted to the rear end of the housing coaxially thereof for conductively coupling the cable to the motor, the connector means being configured and arranged so that rotation of the housing rear part is isolated from the cable.

11. A self-propelled soil penetrometer comprising an elongate streamlined housing substantially symmetrical about a longitudinal axis thereof, the housing including a forward portion comprised of a front section having a pointed forward end and a rear section and a rear portion coaxially aligned with and substantially abutted against the rear end of the rear section of the housing forward portion, means mounting the front and rear sections and the housing rear portion for relative rotation about said axis, a first auger blade secured to and extending helically in one direction along and around the exterior of the front section of the housing forward portion from the forward end thereof to the rear section, a second auger blade secured to and extending helically in the opposite direction along and around the exterior of the rear section, an electric motor mounted in the housing, a transmission mounted in the housing and coupled between the motor and the front and rear sections of the housing forward portion for rotating the sections in opposite directions about the axis relative to the housing rear portion in response to operation of the motor, and a flexible electrical conductor cable connected to the rear end of the housing for supplying electrical power to the motor.

12. Burrowing apparatus for use in soils and the like comprising an elongate housing having a forward portion and a rear portion coaxially aligned with each other, an auger blade secured to and extending helically along and around the exterior of the housing forward portion from the forward end thereof toward the housing rear portion, guide fin means secured to and extending along the exterior of the housing rear portion, electrical drive means mounted in the housing for rotating the housing front portion about the housing axis relative to the housing rear portion and including an electric motor mounted in the housing rear portion, a transmission having a housing and a rotatable output shaft coupled to the motor so that the shaft rotates in response to operation of the motor, means securing the transmission housing to the housing rear portion, and means securing the shaft to the housing forward portion for rotation of the housing forward portion relative to the housing rear portion in response to operation of the motor, and electrical cable means coupled to the housing at the rear end of the housing rear portion for supplying electrical power to the motor.

References Cited

UNITED STATES PATENTS

| | | | |
|---|---|---|---|
| 1,276,706 | 8/1918 | Aydelotte | 299—30 X |
| 1,303,764 | 5/1919 | Broadway | 175—94 X |
| 1,372,318 | 3/1921 | Saliger | 175—94 X |
| 1,388,545 | 8/1921 | Bohan | 299—30 X |
| 2,216,656 | 10/1940 | Smythe | 299—30 |

CHARLES E. O'CONNELL, *Primary Examiner.*

RICHARD E. FAVREAU, *Assistant Examiner.*